United States Patent
Babala et al.

(10) Patent No.: US 9,175,959 B2
(45) Date of Patent: Nov. 3, 2015

(54) MEASURING DEVICE MOUNTING METHOD AND STRUCTURE

(75) Inventors: Mike Babala, Plymouth, MI (US); Carl A. Munch, Troy, MI (US); Paul Zatyko, Westland, MI (US); Michael F. O'Connor, Troy, MI (US)

(73) Assignee: TRW AUTOMOTIVE U.S. LLC, Livonia, MI (US)

( * ) Notice: Subject to any disclaimer, the term of this patent is extended or adjusted under 35 U.S.C. 154(b) by 575 days.

(21) Appl. No.: 13/370,631

(22) Filed: Feb. 10, 2012

(65) Prior Publication Data

US 2012/0210787 A1 Aug. 23, 2012

Related U.S. Application Data

(60) Provisional application No. 61/445,311, filed on Feb. 22, 2011.

(51) Int. Cl.
*G01C 19/5783* (2012.01)

(52) U.S. Cl.
CPC .................................. *G01C 19/5783* (2013.01)

(58) Field of Classification Search
CPC .................................................. G01C 19/5712
USPC ...................................................... 73/504.12
See application file for complete search history.

(56) References Cited

U.S. PATENT DOCUMENTS

| | | | |
|---|---|---|---|
| 6,009,751 A * | 1/2000 | Ljung | 73/504.02 |
| 6,015,722 A | 1/2000 | Banks et al. | |
| 6,140,144 A * | 10/2000 | Najafi et al. | 438/53 |
| 6,310,288 B1 | 10/2001 | Moden | |
| 7,087,994 B2 | 8/2006 | Lee | |
| 7,162,926 B1 | 1/2007 | Guziak et al. | |
| 2007/0164378 A1 | 7/2007 | MacGugan | |
| 2009/0308157 A1 | 12/2009 | Eriksen et al. | |
| 2010/0244277 A1 | 9/2010 | Huang et al. | |

FOREIGN PATENT DOCUMENTS

| | | |
|---|---|---|
| DE | 102005029175 A1 | 1/2006 |
| DE | 102009001930 A1 | 9/2010 |
| DE | 102006048203 B4 | 11/2010 |

* cited by examiner

*Primary Examiner* — Hezron E Williams
*Assistant Examiner* — Mark A Shabman
(74) *Attorney, Agent, or Firm* — Tarolli, Sundheim, Covell & Tummino LLP

(57) ABSTRACT

A measurement device (10) mounting arrangement includes a support member (30) and a sensing device (12) in a circuit housing (22). The circuit housing (22) is electrically and mechanically connected to the support member (30) through a mounting structure (32). The circuit housing (22) has a resonance frequency and the sensing device (12) has an operational resonance frequency. The sensing device (12) measures a physical parameter and provides a signal indicative thereof. An under-fill material (40) is located between the support member (30) and the circuit housing (22) for shifting the resonance frequency of the circuit housing (22) away from the operational resonance frequency of the sensing device (12).

6 Claims, 2 Drawing Sheets

MEASURING DEVICE MOUNTING METHOD AND STRUCTURE

RELATED APPLICATION

This application claims priority from U.S. Provisional Patent Application No. 61/445,311, filed Feb. 22, 2011, the subject matter, which is incorporated herein by reference.

FIELD OF THE INVENTION

The present invention is directed to a measuring device mounting method and structure and is more particularly directed to a measuring device mounting method and structure wherein the measuring device includes a resonant circuit.

BACKGROUND OF THE INVENTION

Measuring devices for sensing vehicle dynamics are known. One particular type measuring device includes an inertial type sensor that can be used for sensing a vehicle roll-over event. Certain sensors for sensing a vehicle roll-over event use gyro(s) to measure an angular rate of rotation about an associated axis of sensitivity. In the era of miniaturization, such inertial sensors that include gyros have been developed using microelectromechanical ("MEMS") technology.

A particular type of MEMS gyro operates on the Coriolis principle, i.e., measuring an apparent deflection force on a moving object as viewed from a rotating reference frame. Coriolis MEMS gyros include an oscillating member having a resonant operating frequency. Coriolis MEMS gyros can be manufacture as part of a circuit package that is mounted to a printed circuit board ("PCB") via a lead frame structure, i.e., wire leads are connected between the circuit package and the PCB providing both electrical and mechanical connection. The PCB may also carry other processing and support circuitry for the MEMS gyro. The PCB with the MEMS gyro is mounted in a known orientation in the vehicle (maybe in a separate housing structure containing other circuitry/sensors) for the measurement of particular vehicle dynamic events such as a vehicle roll-over.

U.S. Pat. No. 7,087,994 appears to show a component mounting arrangement with a support member using an under-fill material to enhance mechanical bonding between the component and the PCB to which the component is mounted. The under-fill material appears to help distribute stress on the component and the electrical connectors, and increase structural integrity. The under-fill material may also help degradation from contaminants such as moisture.

U.S. Patent Application Publication No. 2009/0308157A1 appears to show an integrated inertial measurement system and methods using an epoxy under-fill applied to the periphery of a circuit card assembly to securely fasten the circuit card assembly to a base structure so that the circuit card assembly can withstand high inertial loads.

SUMMARY OF THE INVENTION

The present invention provides a measuring device mounting method and structure that includes an under-fill material to shift the resonant frequency of the measuring device housing away from its operating resonant frequency.

In accordance with one example embodiment of the present invention, a measurement device mounting arrangement includes a support member and a sensing device in a circuit housing. The circuit housing is electrically and mechanically connected to the support member through a mounting structure. The circuit housing has a resonance frequency and the sensing device has an operational resonance frequency. The sensing device measures a physical parameter and provides a signal indicative thereof. An under-fill material is located between the support member and the circuit housing for shifting the resonance frequency of the circuit housing away from the operational resonance frequency of the sensing device.

In accordance with another example embodiment of the present invention, a method is provided for mounting a measurement device comprising the steps of electrically and mechanically securing a sensing device in a circuit housing to a support member through a mounting structure, the circuit housing having a resonance frequency and the sensing device having an operational resonance frequency, the sensing device measuring a physical parameter and providing a signal indicative thereof, and locating an under-fill material between the support member and the circuit housing for shifting the resonance frequency of the circuit housing away from the operational resonance frequency of the sensing device.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION

Figure 1:
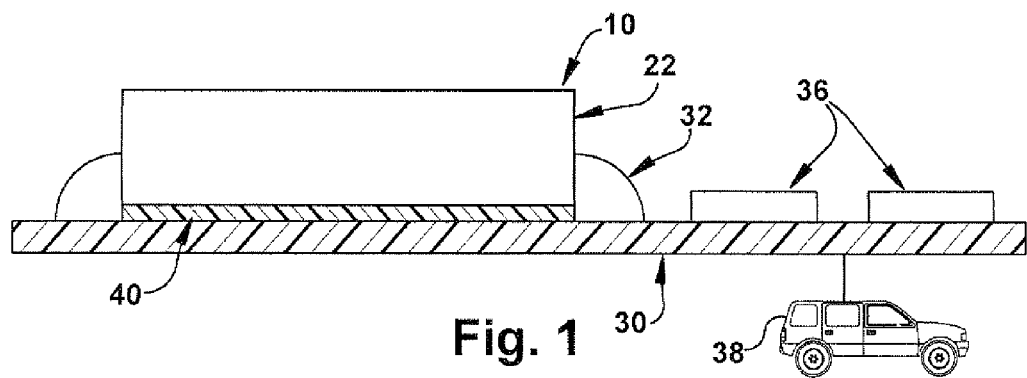
FIG. 1 is a schematic block diagram of a measurement device mounted to a printed circuit board in accordance with an example embodiment of the present invention.
Figure 2:
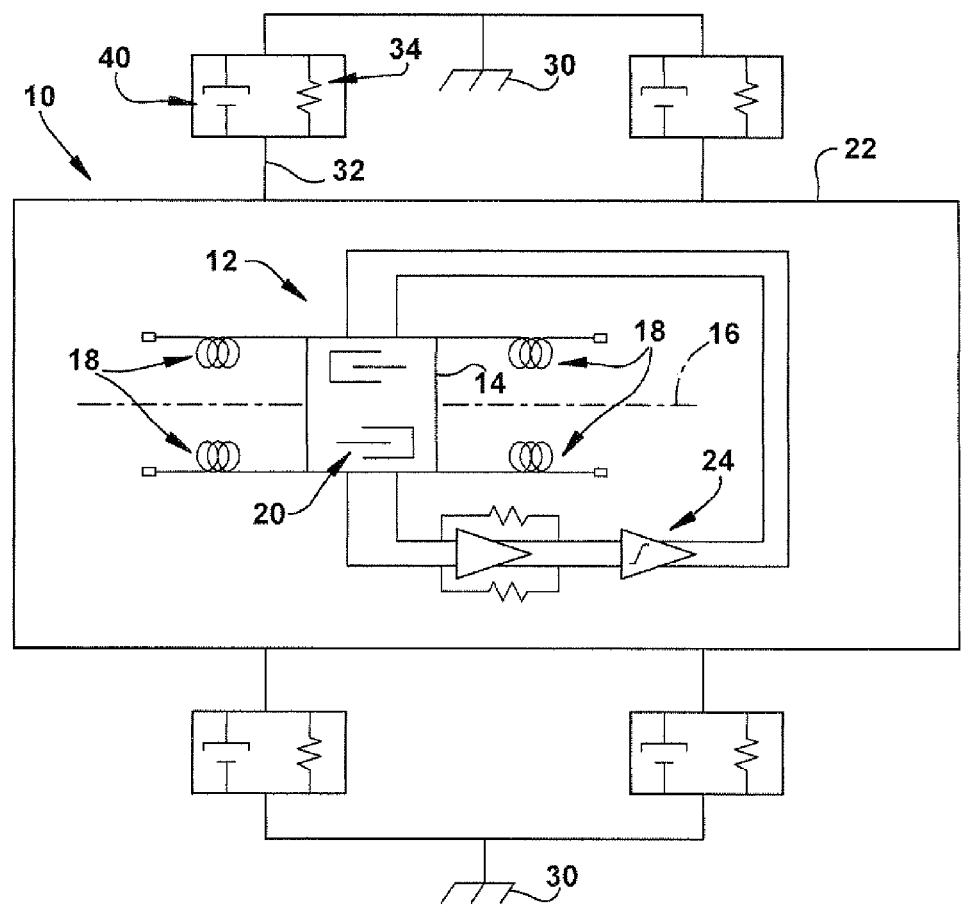
FIG. 2 is a side cross-sectional view of the measurement device and printed circuit board of FIG. 1 showing further mounting details.

Referring to FIGS. 1 and 2, a measurement device 10 is provided for sensing a vehicle operating condition. For example, the measurement device 10 may be an inertial measuring device such as a gyro 12 that senses changes in angular movement (e.g., angular rate) and provides an electrical output signal indicative thereof. One particular type of gyro 12 contemplated is a microelectromechanical ("MEMS") gyro that operates on the Coriolis principle. Such a gyro 12 includes a moving mass 14 that has a resonant frequency. During rotational movement of the sensor, forces against the moving mass 14, as viewed from a rotating reference, are experienced by the moving mass 14. An electrical signal is provided indicative of the sensed rotational forces.

Specifically, the moving mass 14 of the gyro 12 moves back-and-forth along an axis 16 under a drive force as schematically represented by springs 18. A force sensor 20, such as a capacitive sensor, senses force experienced by the moving mass 14 in a direction perpendicular to the axis 16 as would occur if the measurement device 10 were subjected to rotation, i.e., the Coriolis force.

The measurement device 10 may be manufactured using MEMS technology and mounted in a circuit housing (e.g., a chip package) 22. As part of the measurement device 10, processing circuitry 24 may be located within the circuit housing 22 for processing electrical signals from the force sensor 20 and providing an output signal indicative of the sensed rotational forces experienced by the measurement device 10.

The measurement device 10 is mounted to a PCB 30 and is electrically connected to other circuitry on the PCB 30 via lead-frame wires 32. The lead-frame wires 32 provide both an electrical connection and a mechanical connection between the measurement device 10 and the PCB 30. The effective mechanical connection provided by the lead-frame wires 32 and the PCB 30 is schematically shown as springs 34 in FIG. 1.

The PCB 30 may carry other processing circuitry for further processing of the output signal from the measurement device 10. The PCB 30 is mounted to the vehicle 38 at an appropriate location so as to measure a vehicle event such as a vehicle roll-over event.

It has been discovered by the present applicants that during vehicle operation, vibrations experienced by the vehicle 38 are transferred to the PCB 30 and, in turn, to the measurement device 10 through the lead-frame 32. It has further been discovered that circuit housing 22 of the measurement device 10, through the lead-frame connection 32, has a resonant frequency. A problem can occur if the resonant frequency of the circuit housing 22 is close to the resonant operating frequency of the moving mass 14 of the measurement device 10. In accordance with an embodiment of the present invention, a process and structure are provided to shift the resonant frequency of the circuit housing 22 away from the resonant frequency of the moving mass 14 of the measurement device 10 to attenuate vibration affects.

In accordance with the present invention, an under-fill material 40 is operatively located between and in contact with the PCB 30 and the circuit housing 22. The under-fill material 40 could include a variety of possible materials including gel adhesive, epoxy, silicon, rubber, and/or acrylic or any other non-conductive material that would provide desired results in accordance with the present invention. The under-fill material 40 functions as a damper (schematically shown as dampers in FIG. 1) and has the effect of shifting the resonant frequency of the circuit housing 22. The amount of the under-fill material, the amount of the area of contact between the PCB 30 and the circuit housing 22 by the under-fill material, and/or the composition of the under-fill material itself can be selected so as to control the amount and direction of the resonant frequency shift of the circuit housing 22 away from the operational resonant frequency of the measuring device 10.

Figure 3:
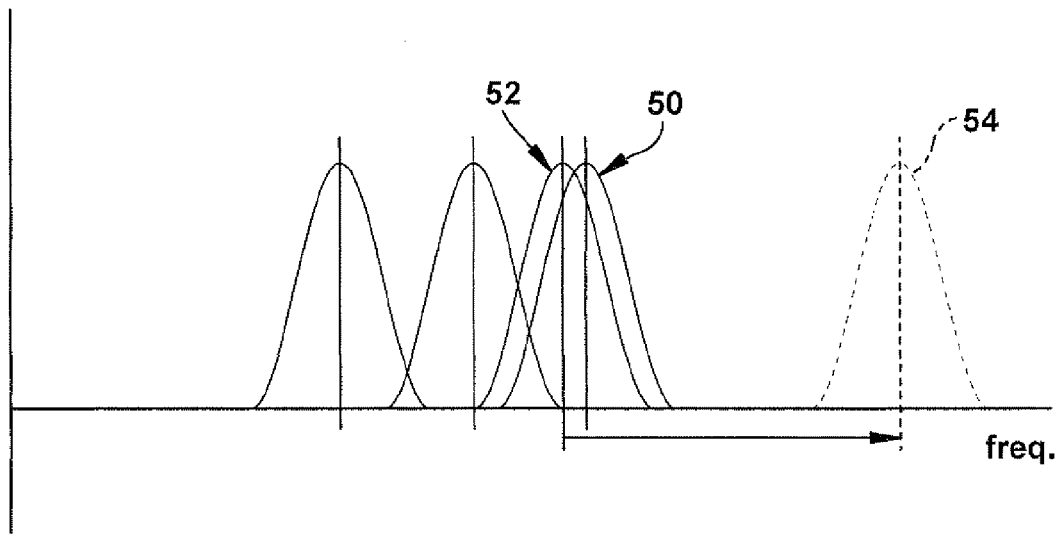
FIG. 3 is a graphical representation showing a frequency shift experienced by the housing for the measurement device as a result of the present invention.

Referring to FIG. 3, the resonant frequency 50 of the moving mass 14 of the measurement device 10 is shown. Also, the resonant frequency 52 of the circuit housing 22 absent any under-fill material is shown. As can be seen, the values of the resonant frequency values 50 and 52 are near each other. The resonant frequency 54 shown is that of the circuit housing 22 when under-fill material 40 is operatively positioned between the PCB 30 and the circuit housing 22. As mentioned, the amount of under-fill material, the amount and pattern of contact of the under-fill with the PCB 30 and the circuit housing 22, and/or the composition of the under-fill material 40 are selected to control the amount of the frequency shift.

With the frequency shift provided by the present invention, vibrations experienced by the vehicle 38 and passed to the measurement device 10 will have an attenuated effect on the measurement value.

From the above description of the invention, those skilled in the art will perceive improvements, changes and modifications. Such improvements, changes and modifications within the skill of the art are intended to be covered by the appended claims.

Having described the invention, the following is claimed:

1. A measurement device mounting arrangement comprising:
   a support member;
   a sensing device in a circuit housing and electrically and mechanically connected to said support member through a mounting structure, the circuit housing having a resonance frequency and the sensing device having an operational resonance frequency, the sensing device measuring a physical parameter and providing a signal indicative thereof; and
   an under-fill material located between said support member and said circuit housing, the amount and location of said under-fill material being such that the resonance frequency of the circuit housing is shifted away from the operational resonance frequency of the sensing device.

2. The measurement device mounting arrangement of claim 1 wherein said under-fill material is a non-conductive material selected from the group comprising a gel adhesive, epoxy, silicon, rubber, and acrylic.

3. The measurement device mounting arrangement of claim 1 wherein said sensing circuit is a MEMS gyro.

4. The measurement device mounting arrangement of claim 3 wherein said MEMS gyro includes a Coriolis sensor that measures angular rate about an axis of sensitivity.

5. A method for mounting a measurement device comprising the steps of:
   electrically and mechanically securing a sensing device in a circuit housing to a support member through a mounting structure, the circuit housing having a resonance frequency and the sensing device having an operational resonance frequency, the sensing device measuring a physical parameter and providing a signal indicative thereof;
   inserting an under-fill material between the support member and the circuit housing in an amount and at a location selected so as to shift the resonance frequency of the circuit housing away from the operational resonance frequency of the sensing device.

6. The method for mounting a measurement device of claim 5 wherein said step of inserting an under-fill material includes the step of selecting the under-fill material from the group comprising a gel adhesive, epoxy, silicon, rubber, and acrylic.

* * * * *